United States Patent
Yokokura (10) Patent No.: US 8,732,497 B2
(45) Date of Patent: May 20, 2014

(54) DATA PROCESSING APPARATUS, METHOD FOR CONTROLLING DATA PROCESSING APPARATUS, AND STORAGE MEDIUM STORING PROGRAM

(75) Inventor: Hidenori Yokokura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 233 days.

(21) Appl. No.: 13/298,194

(22) Filed: Nov. 16, 2011

(65) Prior Publication Data

US 2012/0137150 A1     May 31, 2012

(30) Foreign Application Priority Data

Nov. 29, 2010     (JP) .................................. 2010-265745

(51) Int. Cl.
*G06F 1/26*     (2006.01)
*G06F 3/12*     (2006.01)

(52) U.S. Cl.
CPC ............ *G06F 3/1229* (2013.01); *G03F 1/3203* (2013.01)
USPC ........................................................ 713/320

(58) Field of Classification Search
CPC ..... G06F 3/1229; G06F 1/3203; H04W 52/02
USPC ................................................. 713/300–340
See application file for complete search history.

(56) References Cited

U.S. PATENT DOCUMENTS

| | | | | |
|---|---|---|---|---|
| 4,698,748 A | * | 10/1987 | Juzswik et al. | 713/322 |
| 5,497,494 A | * | 3/1996 | Combs et al. | 713/323 |
| 5,560,021 A | * | 9/1996 | Vook et al. | 713/323 |
| 5,752,044 A | * | 5/1998 | Crump et al. | 713/323 |
| 5,887,176 A | * | 3/1999 | Griffith et al. | 713/320 |
| 5,954,819 A | * | 9/1999 | Kenny et al. | 713/322 |
| 6,193,422 B1 | * | 2/2001 | Belt et al. | 713/320 |
| 6,199,134 B1 | * | 3/2001 | Deschepper et al. | 710/311 |
| 6,246,485 B1 | * | 6/2001 | Brown et al. | 358/1.13 |
| 6,763,379 B1 | * | 7/2004 | Shuster | 709/224 |
| 6,870,890 B1 | * | 3/2005 | Yellin et al. | 375/340 |
| 6,954,864 B2 | * | 10/2005 | Schelling | 713/310 |
| 7,340,615 B2 | * | 3/2008 | Krantz et al. | 713/300 |
| 7,549,065 B2 | * | 6/2009 | Schutte | 713/300 |
| 7,898,995 B2 | * | 3/2011 | Shahidi et al. | 370/311 |
| 7,908,502 B2 | * | 3/2011 | Park | 713/324 |
| 8,130,698 B2 | * | 3/2012 | Cheol | 370/328 |
| 8,327,177 B2 | * | 12/2012 | Farhan et al. | 713/324 |
| 2002/0178389 A1 | * | 11/2002 | Satoh | 713/310 |
| 2006/0092861 A1 | * | 5/2006 | Corday et al. | 370/256 |
| 2009/0094468 A1 | * | 4/2009 | Larson | 713/310 |
| 2009/0100280 A1 | * | 4/2009 | Lindsay | 713/321 |
| 2012/0246502 A1 | * | 9/2012 | Koga | 713/323 |

FOREIGN PATENT DOCUMENTS

JP     2009-151537 A     7/2009

\* cited by examiner

*Primary Examiner* — Paul R Myers
(74) *Attorney, Agent, or Firm* — Canon USA, Inc. IP Division (57) ABSTRACT

An apparatus operates in at least a first mode and a second mode consuming less power than the first mode, and stores information indicating specific data to be responded without shifting from the second mode to the first mode, the data being received from a network during an operation in the second mode. Data received from the network during an operation in the first mode is determined whether to be the specific data indicated by the information stored by a storage unit. When the data is the specific data, a shift from the first mode to the second mode after responding to the received data is faster than when the data is not the specific data.

9 Claims, 8 Drawing Sheets

| OBJECT NAME | OID |
| --- | --- |
| hrDeviceStatus | 1.3.6.1.2.1.25.3.2.1.5 |
| hrPrinterStatus | 1.3.6.1.2.1.25.3.5.1.1 |
| hrPrinterDetectedErrorState | 1.3.6.1.2.1.25.3.5.1.2 |

```
<env:Envelope xmlns:env="http://schemas.xmlsoap.org/soap/envelope/"
env:encodingStyle="http://schemas.xmlsoap.org/soap/encoding/">
  <env:Body>
    <ns:getDevStatus xmlns:ns="cman">
      <client>
        <id>101</id>
        <ip>172.24.177.1</ip>
      </client>
      <device>
        <id>102</id>
        <ip>172.24.177.2</ip>
      </device>
    </ns:getJobStatus>
  </env:Body>
</env:Envelope>
```

FIG.7B

```
<env:Envelope xmlns:env="http://schemas.xmlsoap.org/soap/envelope/"
env:encodingStyle="http://schemas.xmlsoap.org/soap/encoding/">
  <env:Body>
    <ns:getDevStatusResponse xmlns:ns="cman">
      <client>
        <id>102</id>
        <ip>172.24.177.2</ip>
      </client>
        <device>
          <id>101</id>
          <ip>172.24.177.1</ip>
        </device>
        <status>idle<status>
    </ns:getDevStatusResponse>
  </env:Body>
</env:Envelope>
```

FIG.8

DATA PROCESSING APPARATUS, METHOD FOR CONTROLLING DATA PROCESSING APPARATUS, AND STORAGE MEDIUM STORING PROGRAM

BACKGROUND OF THE INVENTION

1. Field of the Invention

The present invention relates to a data processing apparatus that operates in a first mode and a second mode, a method for controlling the data processing apparatus, and a storage medium storing a program.

2. Description of the Related Art

Data processing apparatuses such as a printing apparatus and a copying apparatus have been expected to reduce electric power consumption thereof. There has been a technique for reducing the power consumption as an approach to meeting such a demand. The known technique allows the data processing apparatus in a standby mode to shift to a sleep mode by reducing (or shutting off) the electric power supplied to a main control unit for controlling the data processing apparatus to less than usual, so that the power consumption is further reduced.

Also, data processing apparatuses capable of being connected to networks have become common. Such a data processing apparatus receives and processes data and commands from an information processing apparatus such as a personal computer (PC) via a network, thereby executing a variety of processes.

If such a data processing apparatus employs the above technique for reducing the power consumption, however, data or a command received by the data processing apparatus via a network during the sleep mode are not promptly processed. This is because that if the data or command is received via the network, a main control unit is not in operation during the sleep mode, so that processing of the data or the command is delayed until the data processing apparatus is shifted to a standby mode by resumption of the power supply to the main control unit. When receiving data or a command via a network, the data processing apparatus is shifted to the standby mode by resumption of the power supply to the main control unit, and such a shift is hereinafter referred to as Wake on LAN (WOL).

There is a case where a response to a network packet used in a protocol such as a simple network management protocol (SNMP) for device management is delayed or not properly provided due to the above-described issue. Consequently, there is a case where a device is not properly managed by utility software on a PC that manages the device using the protocol such as SNMP. Particularly, when a data processing apparatus once performs WOL to be a standby mode and then shifts to a sleep mode again immediately after processing data or a command, there are cases where the data processing apparatus cannot respond to the following data or commands transmitted in sequence. Accordingly, a method has been discussed to control such that a data processing apparatus does not shift to a sleep mode for a certain time period after once performing WOL.

Japanese Patent Application Laid-Open No. 2009-151537 discusses a sub-control unit to which electric power is supplied even after the supply of power to a main control unit is shut off, and a proxy response technique in which data or a command received during a sleep mode is responded by the sub-control unit serving as proxy. In the method discussed in Japanese Patent Application Laid-Open No. 2009-151537, a memory in a processing unit that is supplied with the electric power even after shifting to the sleep mode includes a proxy response pattern storage region or a proxy response data storage region, so that the data in these regions is used for proxy response.

However, when all of data pieces or commands are controlled so as not to shift to the sleep mode for a certain time period subsequent to WOL, the following issue may occur. More specifically, when there are a number of devices transmitting data pieces or commands to the data processing apparatus on the network, the data processing apparatus cannot shift to the sleep mode at all.

On the other hand, it is not practical to respond to all of the data pieces or the commands by proxy with the use of the technique discussed in Japanese Patent Application Laid-Open No. 2009-151537 from a standpoint of reducing the power consumption of the data processing apparatus. If the data processing apparatus is configured to respond to all of the data pieces or the commands by proxy, the proxy response pattern storage region or the proxy response data storage region needs to have a large memory capacity. The large memory capacity may consume a large amount of electric power even in the sleep mode.

SUMMARY OF THE INVENTION

According to an aspect of the present invention, an apparatus operating in at least a first mode and a second mode consuming less power than the first mode includes a storage unit configured to store information indicating specific data to be responded without shifting from the second mode to the first mode, the data being received from a network during an operation in the second mode, a reception unit configured to receive data from the network during an operation in the first mode, a determination unit configured to determine whether the data received is the specific data, and a control unit configured to control such that a shift from the first mode to the second mode after responding to the received data is faster in the case the data is the specific data than in the case the data is not the specific data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
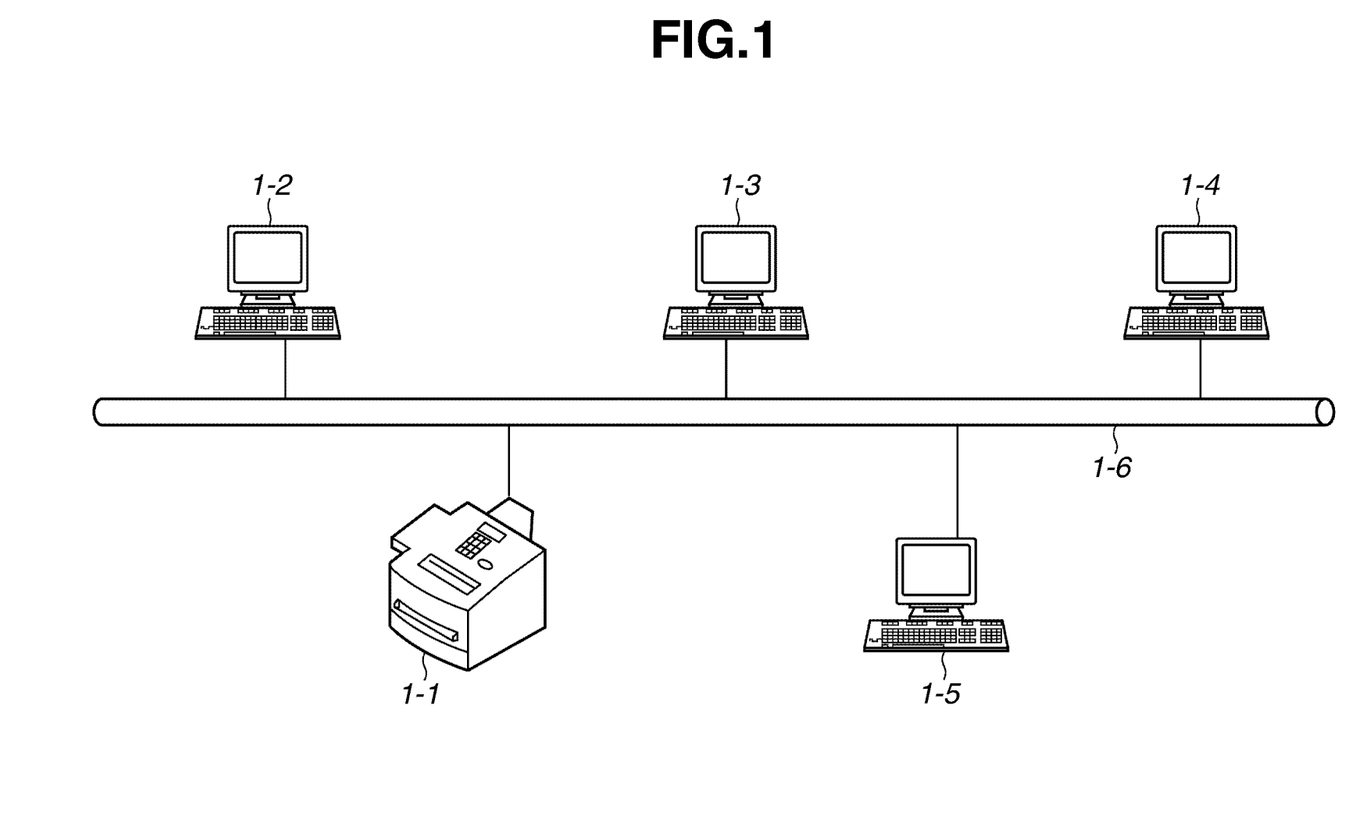
FIG. 1 illustrates a configuration of a network system that uses a data processing apparatus according to an exemplary embodiment of the present invention.

FIG. 1 illustrates a configuration of a network system that uses a data processing apparatus according to a first exemplary embodiment of the present invention. A data processing apparatus 1-1 and host computers 1-2, 1-3, 1-4, and 1-5 are connected via a network 1-6 for mutual communication. The data processing apparatus 1-1 is, for example, a printer, a scanner, a copying machine, a facsimile machine, or a multi-function peripheral.

The data processing apparatus 1-1 according to the present exemplary embodiment can operate in at least two modes such as a first mode and a second mode that consumes less electric power than the first mode (data processing apparatus may operate in other electric modes). A component to be supplied with the electric power in each mode is described below. The first mode and the second mode are hereinafter referred to as a normal mode and a sleep mode, respectively.

The host computers 1-2 through 1-5 are examples of an information processing apparatus. Alternatively, a mobile terminal and other devices may be used. The host computer is, for example, a personal computer used by a general user or a server serving as a management device for managing terminals on a network. The network 1-6 may be a local area network (LAN), the Internet, or a wireless network.

Figure 2:
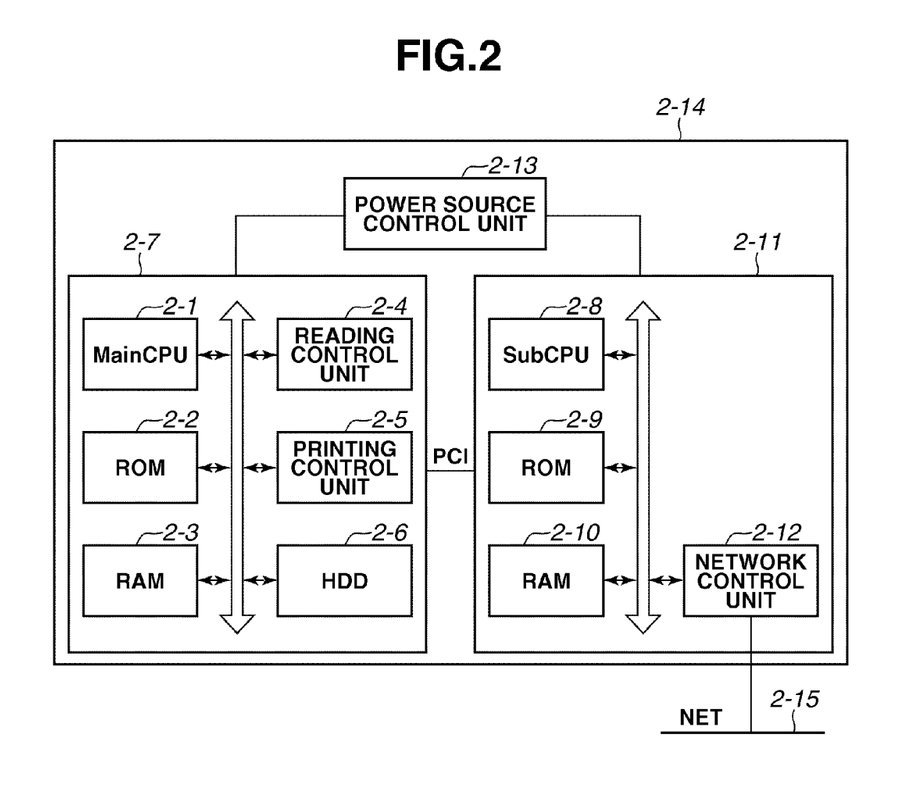
FIG. 2 is a block diagram illustrating a hardware configuration in the data processing apparatus according the exemplary embodiment of the present invention.

FIG. 2 is a block diagram illustrating a hardware configuration in the data processing apparatus according to the present exemplary embodiment.

The data processing apparatus 1-1 includes a main control unit 2-7 that is controlled by a main central processing unit (CPU) 2-1, and a sub-control unit 2-11 that is controlled by a Sub-CPU 2-8. The main control unit 2-7 and the sub-control unit 2-11 are connected via a peripheral component interconnect (PCI) bus. The main control unit 2-7 controls a reading control unit 2-4 and a printing control unit 2-5 to realize a copying function and a printing function as the data processing apparatus. These functions are controlled by a program that is stored in a read only memory (ROM) 2-2 or a hard disk drive (HDD) 2-6. When the data processing apparatus 1-1 is started, such a program is read by a random access memory (RAM) 2-3 and executed by the Main CPU 2-1.

The sub-control unit 2-11 has a function of receiving and transmitting network packets via a network control unit 2-12 and a network 2-15. The sub-control unit 2-11 also realizes a function of controlling the data processing apparatus 1-1 to return to the normal mode after the data processing apparatus 1-1 shifts to the sleep mode. A program for controlling these functions is stored in a ROM 2-9. When the data processing apparatus 1-1 is started, the program is read by a RAM 2-10 and executed by the Sub-CPU 2-8.

The main control unit 2-7 transmits information serving as a return condition to the sub-control unit 2-11, and the RAM 2-10 stores the information therein. The information serving as the return condition is used to return the data processing apparatus 1-1 from the sleep mode, which is described below. A power source control unit 2-13 controls the supply of electric power to each block of the data processing apparatus 1-1. Specifically, when the power source control unit 2-13 stops the supply of power to the main control unit 2-7, the data processing apparatus 1-1 shifts to the sleep mode from the normal mode, thereby suppressing the electric power consumption of the entire apparatus.

Figure 3A:
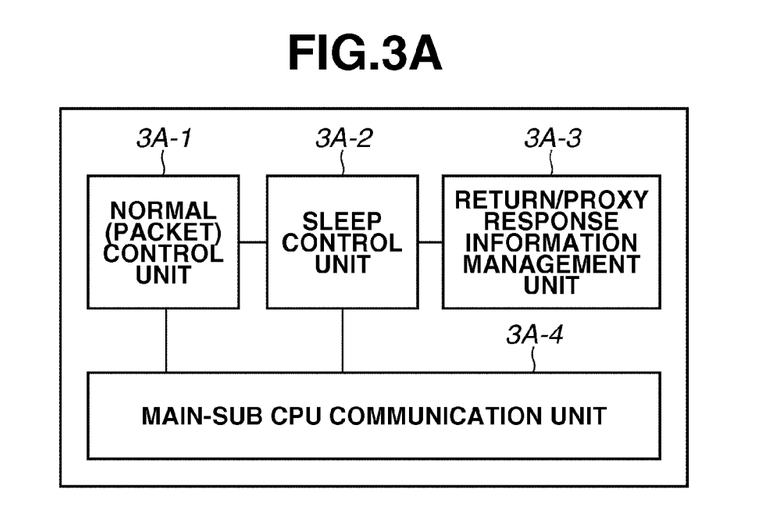
FIGS. 3A and 3B are block diagrams illustrating a software configuration in the data processing apparatus according to the exemplary embodiment of the present invention.
Figure 3B:
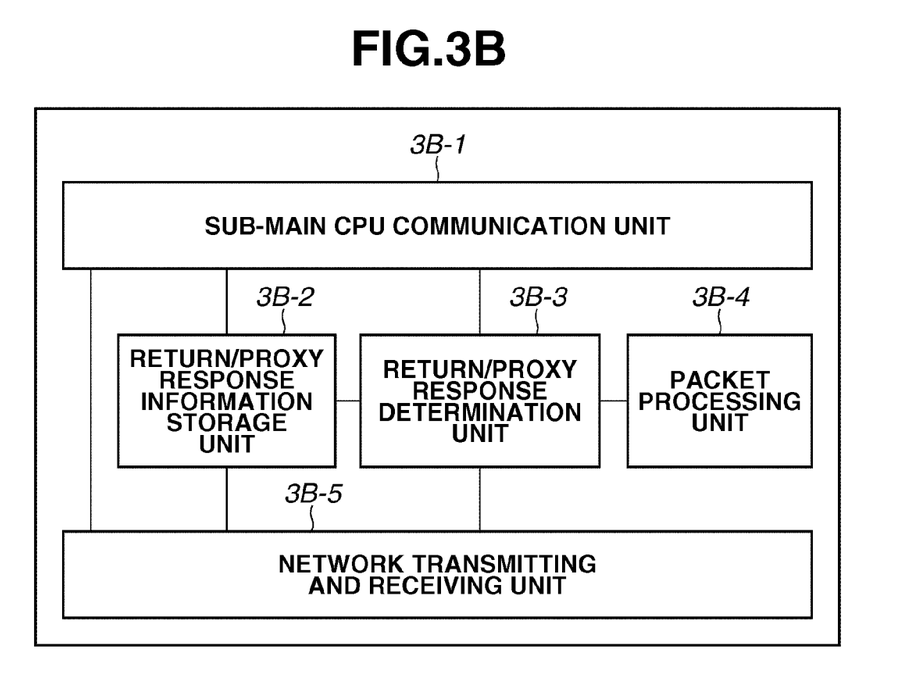

FIGS. 3A and 3B are block diagrams illustrating a software configuration of the data processing apparatus according to the present exemplary embodiment.

FIG. 3A is a block diagram illustrating a software configuration of the main control unit 2-7 in the data processing apparatus 1-1 according to the present exemplary embodiment. Each of all the blocks is executed in parallel to one another by the main CPU 2-1. A normal control unit 3A-1 for controlling packets such an SNMP packet and a SOAP packet controls each operation of the data processing apparatus in the normal mode. A return/proxy response information management unit 3A-3 stores the information relating to the condition for the return to the normal mode from the sleep mode in a storage unit such as ROM and HDD.

A sleep control unit 3A-2 acquires return/proxy response condition information stored by the return/proxy response information management unit 3A-3, and transmits such condition information to a Main-Sub CPU communication unit 3A-4. Subsequently, the sleep control unit 3A-2 instructs the power source control unit 2-13 to shift the data processing apparatus 1-1 to the sleep mode. The Main-Sub CPU communication unit 3A-4 communicates with a Sub-Main CPU communication unit 3B-1, so that the information is transmitted to and received from the sub-control unit 2-11.

FIG. 3B is a block diagram illustrating a software configuration of the sub-control unit 2-11 in the data processing apparatus 1-1 according to the present exemplary embodiment. Each of all the blocks is executed in parallel to one another by the Sub-CPU 2-8. The Sub-Main CPU communication unit 3B-1 communicates with the Main-Sub CPU communication unit 3A-4, so that the information is transmitted to and received from the main control unit 2-7. A return/proxy response information storage unit 3B-2 receives the return/proxy response condition information from the return/proxy response information management unit 3A-3 via the Sub-Main CPU communication unit 3B-1, and stores the condition information in a storage unit such as a RAM.

A return/proxy response determination unit 3B-3 analyzes a packet received from a network transmitting and receiving unit 3B-5, and determines whether to allow a return to the normal mode or a proxy response based on the information stored in the return/proxy response information storage unit 3B-2. The return/proxy response determination unit 3B-3 determines to allow the proxy response when receiving a specific packet pattern, whereas the return/proxy response determination unit 3B-3 determines to allow the return to the normal mode when receiving a packet to the own data processing apparatus other than the specific packet pattern.

In the normal mode, a packet received by the network transmitting and receiving unit 3B-5 is transferred to the main control unit 2-7 via the Sub-Main CPU communication unit 3B-1 as it is. In the sleep mode, on the other hand, a packet received by the network transmitting and receiving unit 3B-5 is transferred to the return/proxy response determination unit 3B-3.

When the proxy response is determined to be allowed, a packet processing unit 3B-4 generates a packet pattern for the proxy response and allows the pattern to be transmitted to the host computer by the network transmitting and receiving unit 3B-5. When the proxy response is determined to be allowed, that is, when a proxy response is performed, a received packet is responded without shifting the data processing apparatus to the normal mode from the sleep mode.

Figure 4:
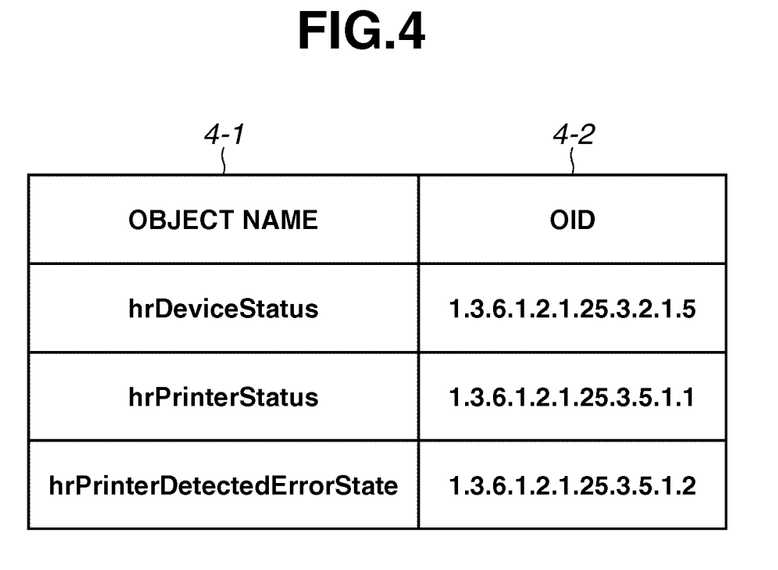
FIG. 4 illustrates a table to be managed by a return/proxy response information management unit according to the exemplary embodiment of the present invention.

FIG. 4 is an example of a table describing contents of data to be responded by proxy when the data processing apparatus according to the present exemplary embodiment is in the sleep mode. The table in FIG. 4 is stored in the ROM 2-2 or the HDD 2-6 by the return/proxy response information management unit 3A-3. The table is also stored in the RAM 2-10 by the return/proxy response information storage unit 3B-2.

The example in FIG. 4 includes an object name 4-1 and an object identifier (OID) 4-2 of management information base (MIB) in the SNMP. When the data processing apparatus 1-1 receives an SNMP command including the specified OID as described in FIG. 4 during the sleep mode, the sub-control unit 2-11 performs the proxy response as described above without WOL.

The exemplary embodiment of the present invention uses the object name and the OID in FIG. 4, but not limited to thereto. One set of OIDs is registered in the table in FIG. 4, but a plurality of sets of OIDs may be registered in the table. Each of the OIDs included in one set may not necessarily be fixed, and an OID may be dynamically added. The object name 4-1 may not be provided while only the OID 4-2 may be stored as data, or vice versa.

The example OID illustrated in FIG. 4 is a set of OIDs that are often transmitted on a network on a periodic basis by an operating system (OS) of a general PC. Accordingly, in a case where a command including these specified OIDs is configured to be a proxy response target, the data processing apparatus can remain in the sleep mode even if there are a number of PCs on the network.

Figure 5:
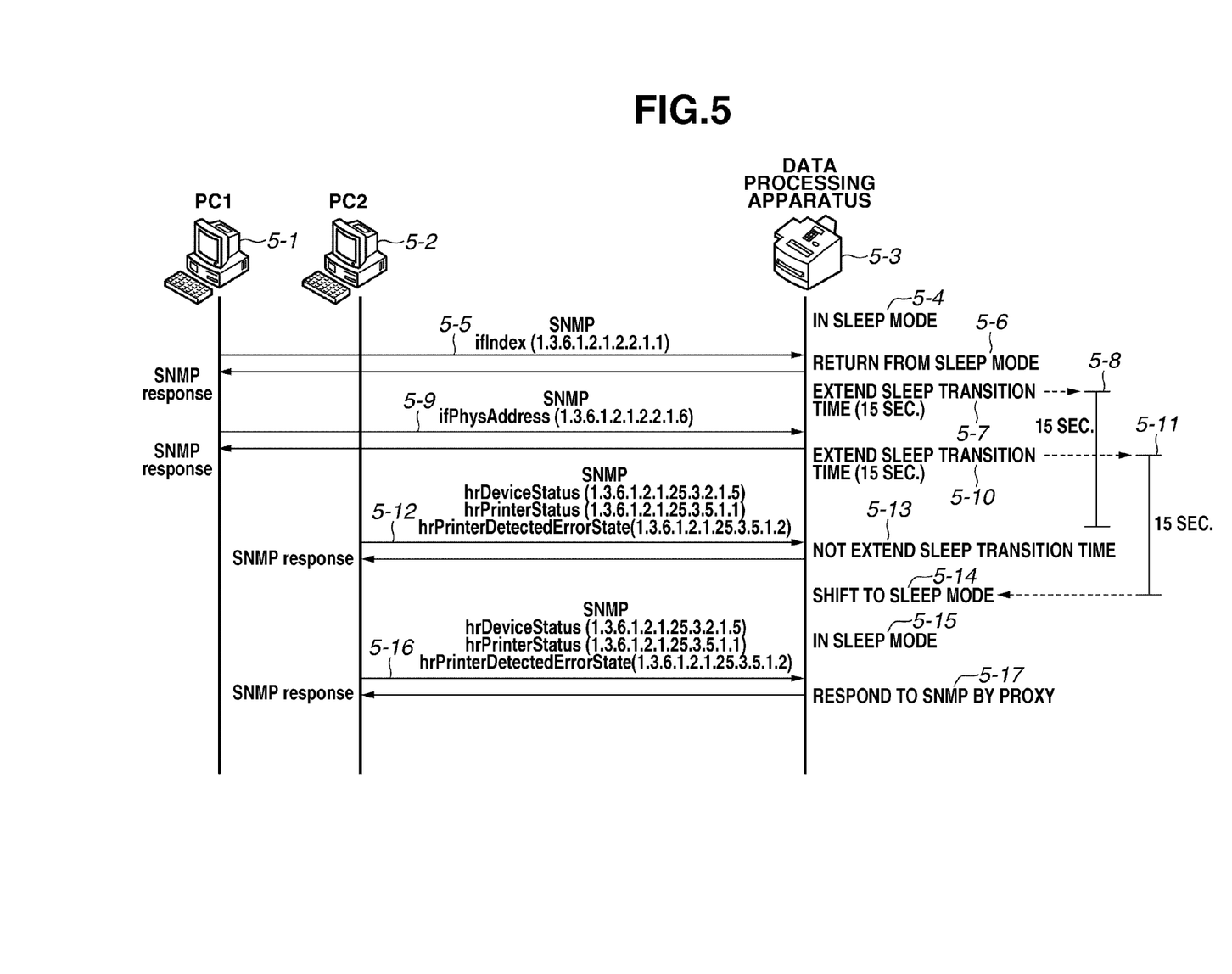
FIG. 5 is a sequence diagram illustrating communication between host computers and the data processing apparatus according to the exemplary embodiment of the present invention.

FIG. 5 is a sequence diagram illustrating communication between the host computers and the data processing apparatus by SNMP according to the present exemplary embodiment.

A data processing apparatus 5-3 can perform network communication with host computers 5-1 and 5-2 (hereinafter referred to as a PC 1 and a PC 2, respectively) by the SNMP.

The PC 1 (5-1) acquires information of the data processing apparatus 5-3 on a non-periodic basis. For example, the PC 1 is a management server for managing apparatuses on a network. An SNMP if Index in step 5-5 and an SNMP if Phys-Address in step 5-9 are MIB objects and serve as a portion of device information.

The PC 2 (5-2) issues a command to the data processing apparatus 5-3 at 10-minute intervals to inquire about the OID in the SNMP in FIG. 4 in steps 5-12 and 5-16, and monitors the status of the data processing apparatus 5-3. The PC 2 is, for example, a personal computer used by a general user. In step 5-4, a current mode of the data processing apparatus 5-3 is indicated. That is, the data processing apparatus 5-3 is currently in the sleep mode.

In step 5-5, the data processing apparatus 5-3 receives an SNMP packet thereto. In step 5-6, the data processing apparatus 5-3 returns to the normal mode from the sleep mode in response to the reception of the SNMP packet transmitted thereto. In step 5-7, the data processing apparatus 5-3 extends a sleep transition time to wait for a next SNMP packet.

In the example in FIG. 5, the sleep transition time is extended by 15 seconds. Then, the data processing apparatus 5-3 transmits a response to the SNMP packet received in step 5-5 to the PC 1. In step 5-8, the sleep transition time of 15 seconds extended by step 5-7 is indicated.

In step 5-9, the data processing apparatus 5-3 receives an SNMP packet transmitted thereto. Since the timing for step 5-9 is within 15 seconds indicated in step 5-8, the data processing apparatus 5-3 does not shift to the sleep mode and in the normal mode. In step 5-10, the data processing apparatus 5-3 extends the sleep transition time again. More specifically, the data processing apparatus 5-3 disregards the 15 seconds extended by step 5-8 and extends the sleep transition time again so as to shift to the sleep mode in 15 seconds from this point in time. Then, the data processing apparatus 5-3 transmits a response to the SNMP packet received in step 5-9 to the PC 1.

After responding to the SNMP packet which is a return factor to the normal mode from the sleep mode, the data processing apparatus according to the present exemplary embodiment remains in the normal mode for a predetermined time period instead of shifting to the sleep mode immediately subsequent to the response to the SNMP packet. Accordingly, the data processing apparatus does not necessarily return from the sleep mode upon each reception of the SNMP packet, thereby reducing occurrences of a delay in response or non-response.

In step 5-12 in FIG. 5, the data processing apparatus 5-3 receives an SNMP packet which is transmitted thereto and includes the OID described in the table in FIG. 4 from the PC 2. Since the timing for step 5-12 is within 15 seconds indicated in step 5-11, the data processing apparatus 5-3 does not shift to the sleep mode and is in the normal mode.

However, in step 5-13, the sleep transition time is not extended unlike step 5-7 or step 5-10. In other words, when the data processing apparatus 5-3 receives the SNMP packet including the OID as illustrated in the table in FIG. 4, the sleep transition time is not extended. The data processing apparatus 5-3 transmits a response to the SNMP packet received in step 5-12 to the PC 2.

In step 5-14, the data processing apparatus shifts to the sleep mode from the normal mode in response to a lapse of the sleep transition time of 15 seconds indicated in step 5-11. In step 5-15, a current mode of the data processing apparatus 5-3 is indicated, that is, the data processing apparatus 5-3 is currently in the sleep mode.

In step 5-16, the data processing apparatus receives a SNMP packet which is transmitted thereto and includes the OID described in the table in FIG. 4 from the PC 2 again. The OID described in the table in FIG. 4 is data to be targeted for the proxy response. Thus, in step 5-17, the data processing apparatus 5-3 responds to the received SNMP packet while remaining in the sleep mode.

In the example in FIG. 5, only two PCs of the PC 1 and PC 2 are used as devices to transmit the SNMP packets to the data processing apparatus 5-3, and the extension of the sleep transition time is set to be 15 seconds. However, the number of the PCs and a length of the extension time are not limited thereto. The extension time may be optionally set by a user.

Figure 6:
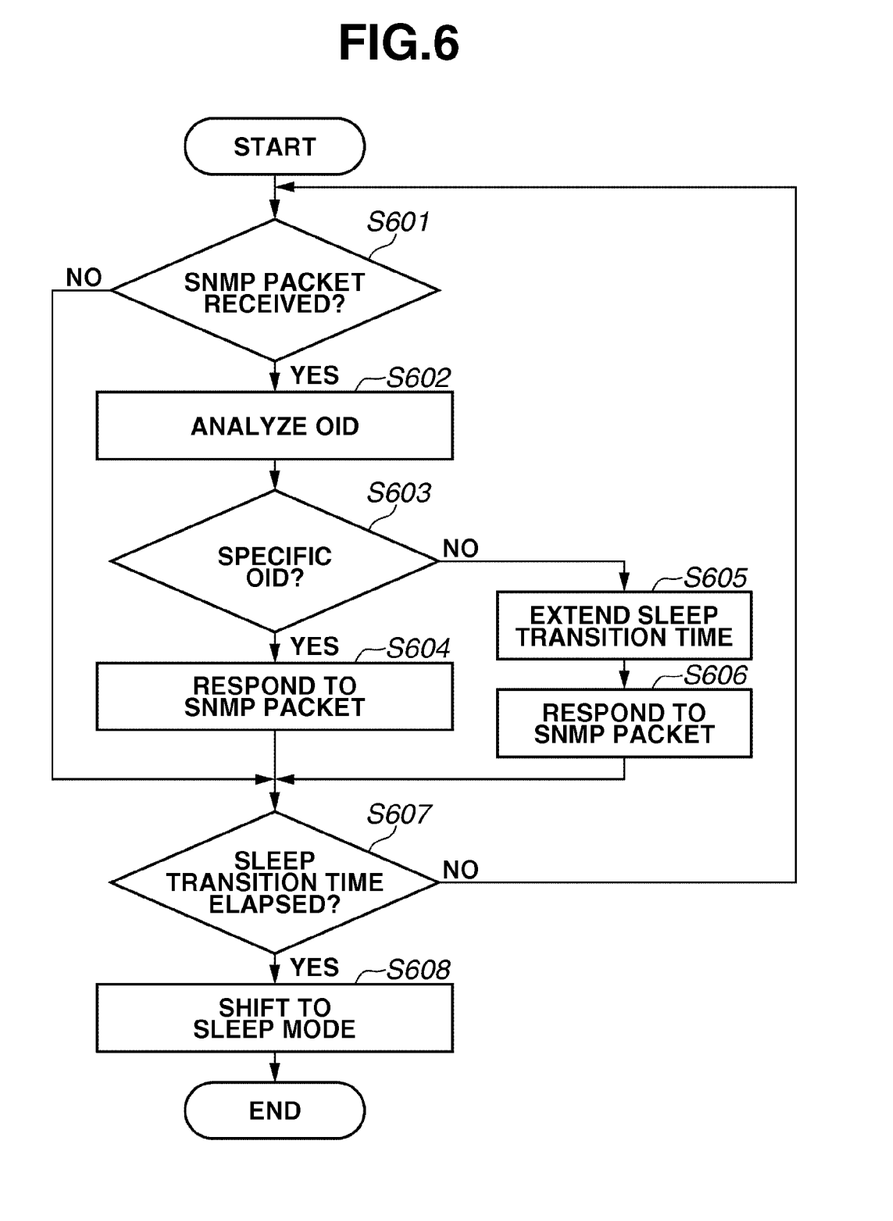
FIG. 6 is a flowchart illustrating an operating procedure of the data processing apparatus in a normal mode according to the exemplary embodiment of the present invention.

FIG. 6 is a flowchart illustrating an example operation of the data processing apparatus in the normal mode according to the present exemplary embodiment. Although the data processing apparatus according to the present exemplary embodiment executes various types of data processing according to instructions from the operation unit thereof and data received via the network, processing for receiving an SNMP packet is described with reference to the flowchart in FIG. 6. In each step in FIG. 6, the RAM 2-3 reads a program stored in the ROM 2-2 or the HDD 2-6 of the data processing apparatus, and the Main CPU 2-1 executes the program.

In step S601, the Main CPU 2-1 determines whether an SNMP packet transmitted from the host computer via the network is received. If the SNMP packet is not received (NO in step S601), the operation proceeds to step S607. The data processing apparatus according to the present exemplary embodiment shifts to the sleep mode when no operation is made and no data is received for a certain time period in the normal mode.

In step S607, the Main CPU 2-1 determines whether the certain time period has elapsed. The sleep transition time is set by a user in advance. The sleep transition time can be, for example, one minute or ten minutes, and is stored in the RAM 2-3 or the HDD 2-6 of the data processing apparatus. A timer (not shown) counts an elapsed time.

The operation returns to step S601 until the time for the sleep mode elapses, and the Main CPU 2-1 repeatedly determines whether the SNMP packet is received. If the Main CPU 2-1 determines that the time for the sleep mode has elapsed (YES in S607), then in step S608, the power source control unit 2-13 stops the supply of electric power to the sub-control unit 2-11. The stop of the power supply shifts the data processing apparatus to the sleep mode, and the operation illustrated in the flowchart ends.

If the Main CPU 2-1 determines that the SNMP packet is received (YES in step S601), the operation proceeds to step S602. In step S602, the Main CPU 2-1 analyzes the specified OID in the received SNMP packet.

In step S603, the Main CPU 2-1 determines whether the OID analyzed in step S602 matches the OID described in the table in FIG. 4, that is, the table stored in the ROM 2-2 or the HDD 2-6 by the return/proxy response information management unit 3A-3. If the Main CPU 2-1 determines that the OID analyzed in step S602 matches the OID described in the table in FIG. 4 (YES in step S603), the operation proceeds to step S604. If these OIDs do no match each other (NO in step S603), the operation proceeds to step S605.

In step S605, the Main CPU 2-1 extends the sleep transition time serving as a time to shift the data processing apparatus to the sleep mode by a predetermined time (e.g., 15 seconds).

Accordingly, the data processing apparatus according to the present exemplary embodiment has the sleep transition time (e.g., one minute) serving as a condition to shift to the sleep mode when a certain time period has elapsed without any operation or any data reception. This sleep transition time is referred to as a first sleep transition time. The sleep transition time extended in step S605 differs from this first sleep transition time. The sleep transition time extended in step S605 serves as a condition to shift to the sleep mode from the normal mode, and is referred to as a second sleep transition time.

In step S607, the Main CPU 2-1 determines whether to shift to the sleep mode based on a condition in which the first sleep transition time or the second sleep transition time whichever comes later has elapsed, and then the operation proceeds to step S608. In other words, if both of the first and second sleep transition times have elapsed (YES in step S607), the Main CPU 2-1 shifts the data processing apparatus to the sleep mode.

As similar to the first sleep transition time, the second sleep transition time is stored in the RAM 2-3 or the HDD 2-6 of the data processing apparatus, and a timer (not shown) counts an elapsed time. The second sleep transition time is set to zero second by default when extension is not made in step S605.

As a result of the processing in step S605, if an SNMP packet including a specified OID that is not described in the table in FIG. 4 is received, the data processing apparatus remains in the normal mode at least for the extended second sleep transition time.

After the second sleep transition time is extended in step S605, the operation proceeds to step S606. In step 606, the Main CPU 2-1 transmits a response to the received SNMP packet to the host computer which is a transmission source of the SNMP packet. Then, the operation proceeds to step S607.

On the other hand, if the OID analyzed in step S602 matches the OID described in the table (YES in step S603), the operation proceeds to step S604. In step S604, the Main CPU 2-1 transmits a response to the received SNMP packet to the host computer which is the transmission source. In this case, the Main CPU 2-1 does not extend the second sleep transition time. Subsequently, the operation proceeds to step S607. The following steps including step S607 are processed as described above.

Accordingly, the data processing apparatus does not extend the sleep transition time when receiving the SNMP packet in which the specific OID described in the table in FIG. 4 is specified, whereas the data processing apparatus extends the sleep transition time when receiving an SNMP packet in which another OID is specified. More specifically, the data processing apparatus does not extend the sleep transition time when receiving a packet to be responded by proxy, whereas the data processing apparatus extend the sleep transition time when receiving another packet.

Therefore, the data processing apparatus can remain in the normal mode by extending the sleep transition time to provide for the case where packets that cannot be responded by proxy are transmitted in sequence, so that the data processing apparatus can appropriately respond to data or commands from the host computer. In addition, when the data processing apparatus does not necessarily remain in the normal mode, the data processing apparatus can quickly shift to the sleep mode without extending the sleep transition time, so that the power consumption thereof can be reduced.

The first exemplary embodiment is described with respect to an example in which the OID of the MIB in the SNMP is registered in the table in FIG. 4. However, such a table in FIG. 4 including data to be responded by proxy may include information based on other protocols. A second exemplary embodiment is described with respect to an example in which a proxy response is made to a specific SOAP method. In the second exemplary embodiment, a network system configuration, and hardware and software configurations of a data processing apparatus are similar to those in the first exemplary embodiment, and the descriptions thereof are omitted.

Figure 7A:
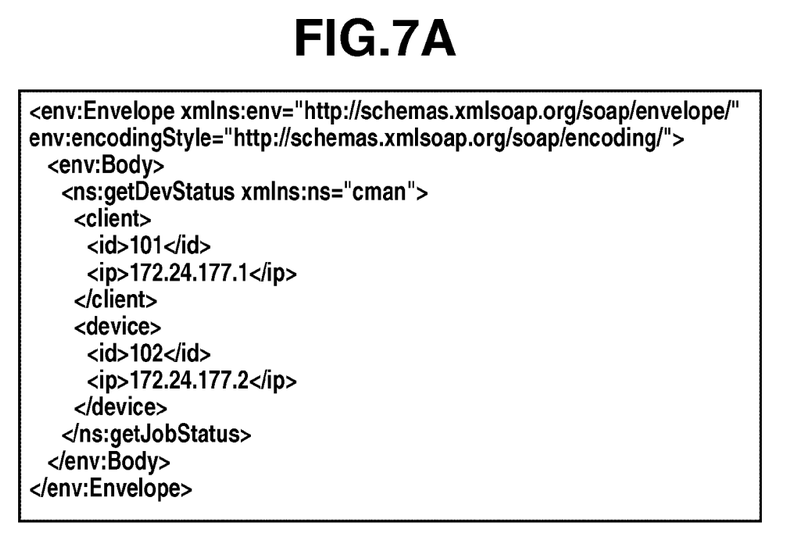
FIGS. 7A and 7B respectively illustrate a simple object access protocol (SOAP) method and an example response thereto according to the exemplary embodiment of the present invention.
Figure 7B:
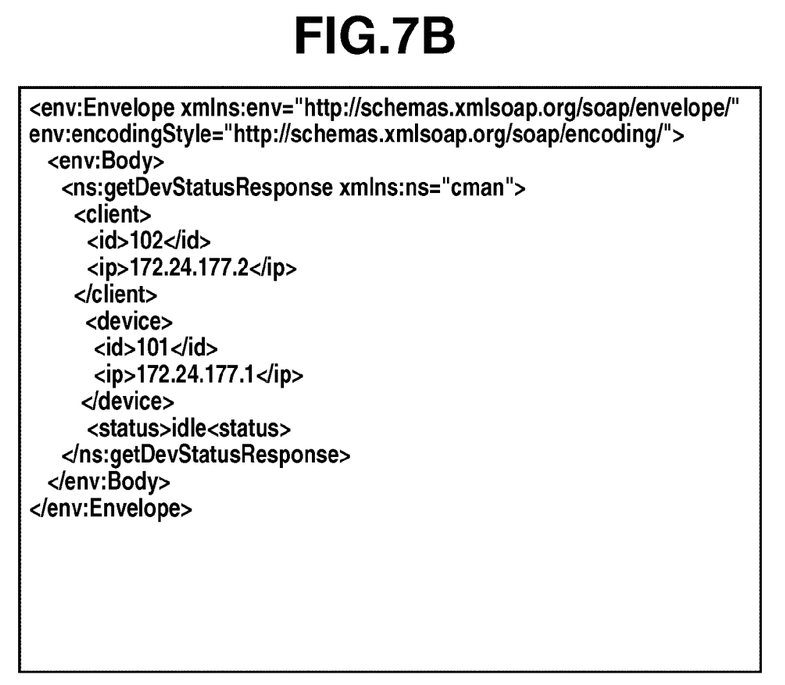

FIGS. 7A and 7B respectively illustrate an example of a SOAP method of an inquiry from a host computer and a SOAP method of a response thereto according to the second exemplary embodiment of the present invention. FIG. 7A illustrates a SOAP method that requests status acquisition. FIG. 7B illustrates a SOAP method responding to the SOAP method in FIG. 7A by providing status information.

The method in FIG. 7A is named "getDevStatus", and includes an own device information (ID, IP address) and a partner device information (ID, IP address). The method in FIG. 7B is named "getDevStatusResponse", and includes the own device information, the partner device information, and <status> indicating a status of the data processing apparatus. In the second exemplary embodiment, a specific SOAP method is included in a table in FIG. 4. For example, the SOAP method such as "getDevStatus" and "getJobStatus" is described in the table.

Figure 8:
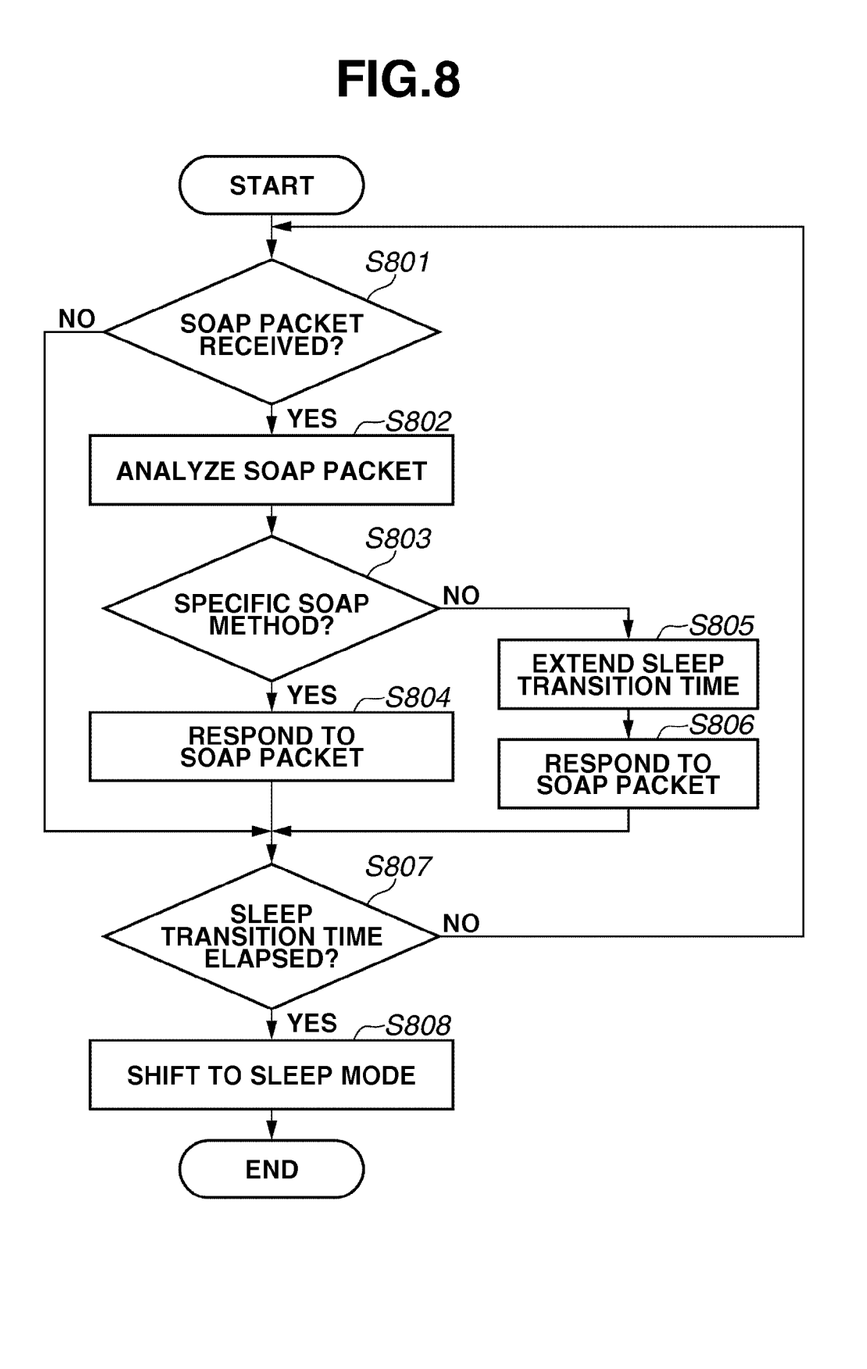
FIG. 8 is a flowchart illustrating an operating procedure of the data processing apparatus in a normal mode according to the exemplary embodiment of the present invention.

FIG. 8 is a flowchart illustrating an example operation of the data processing apparatus in the normal mode according to the present exemplary embodiment. Although the data processing apparatus according to the present exemplary embodiment executes various types of data processing according to instructions from the operation unit thereof and data received via the network, processing for receiving a SOAP packet is described with reference to the flowchart in FIG. 8. In each step in FIG. 8, the RAM 2-3 reads a program stored in the ROM 2-2 or the HDD 2-6 of the data processing apparatus, and the Main CPU 2-1 executes the program.

In step S801, the Main CPU 2-1 determines whether a SOAP packet transmitted from the host computer via the network is received. If the SOAP packet is not received (NO in step S801), the operation proceeds to step S807.

In step S807, the Main CPU 2-1 determines whether a certain time period has elapsed. The operation returns to step S801 until the sleep transition time elapses (NO in step S807), and the Main CPU 2-1 repeatedly determines whether the SOAP packet is received.

If the Main CPU 2-1 determines that the sleep transition time has elapsed (YES in S807), then in step S808, the power source control unit 2-13 stops the supply of electric power to the sub-control unit 2-11. The stop of the power supply shifts the data processing apparatus to the sleep mode, and the operation illustrated in the flowchart ends.

If the Main CPU 2-1 determines that the SOAP packet is received (YES in step S801), the operation proceeds to step S802. In step S802, the Main CPU 2-1 analyzes a SOAP method specified in the received SOAP packet.

In step S803, the Main CPU 2-1 determines whether the SOAP method analyzed in step S802 matches the SOAP method described in the table in FIG. 4, that is, the table stored by the return/proxy response information management unit 3A-3. If the Main CPU 2-1 determines that the SOAP method analyzed in step S802 matches the SOAP method described in the table in FIG. 4 (YES in step S803), the operation proceeds to step S804. If these SOAP methods do no match each other (NO in step S803), the operation proceeds to step S805.

In step S805, the Main CPU 2-1 extends the sleep transition time serving as a time to shift the data processing apparatus to the sleep mode by a predetermined time (e.g., 15 seconds). The sleep transition time to be extended at this time is the second sleep transition time as similar to that in step S605 in FIG. 6.

In step S807, the Main CPU 2-1 determines whether to shift to the sleep mode based on a condition in which the first sleep transition time or the second sleep transition time whichever comes later has elapsed. Subsequently, in step S808, the data processing apparatus shifts to the sleep mode. After extending the second sleep transition time in step S805, the operation proceeds to step S806.

In step S806, the Main CPU 2-1 transmits a response to the received SOAP packet to the host computer which is a transmission source of the SOAP packet, and then the operation proceeds to step S807.

If the SOAP method analyzed in step S802 matches the SOAP method described in the table (YES in step S803), the operation proceeds to step S804. In step S804, the Main CPU 2-1 transmits a response to the received SOAP packet to the host computer which is the transmission source. In this case, the Main CPU 2-1 does not extend the second sleep transition time. Subsequently, the operation proceeds to step S807. The following steps including step S807 are processed as described above.

Therefore, the data processing apparatus according to the present exemplary embodiment does not extend the sleep transition time when receiving the SOAP packet in which the specific SOAP method described in the table in FIG. 4 is specified, whereas the data processing apparatus extends the sleep transition time when receiving a SOAP packet in which another SOAP method is specified.

The present invention may be realized by a method other than those of the above exemplary embodiments. For example, a plurality of apparatuses may be formed as one data processing apparatus instead of one apparatus formed as one data processing apparatus as described above. Moreover, the present invention may be realized by a combination of the above exemplary embodiments.

Aspects of the present invention can also be realized by a computer of a system or apparatus (or devices such as a CPU or a micro processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-265745 filed Nov. 29, 2010, which is hereby incorporated by reference herein in its entirety.

What is claimed is:

1. A data processing apparatus operating in at least a first power mode and a second power mode consuming less power than the first mode, the apparatus comprising:
    a receiving unit configured to receive a Simple Network Management Protocol (SNMP) packet transmitted from an external apparatus;
    a determining unit configured to determine whether to delay the data processing apparatus to shift from the first power mode to the second power mode based on an object identifier (OID) specified in the SNMP packet received by the receiving unit;
    a controlling unit configured to, in a case where the determining unit determines to delay the data processing apparatus to shift from the first power mode to the second power mode, delay the data processing apparatus to shift from the first power mode to the second power mode for a predetermined time, and in a case where the determining unit determines not to delay the data processing apparatus to shift from the first power mode to the second power mode, not delay the data processing apparatus to shift from the first power mode to the second power mode; and
    a shifting unit configured to shift the data processing apparatus from the first power mode to the second power mode when the predetermined time elapses.

2. The data processing apparatus according to claim 1,
    wherein in a case where the OID specified in the SNMP packet received by the receiving unit is a specific OID, the determining unit determines not to delay the data processing apparatus to shift from the first power mode to the second power mode, and in a case where the OID specified in the SNMP packet received by the receiving unit is not a specific OID, the determining unit determines to delay the data processing apparatus to shift from the first power mode to the second power mode.

3. The data processing apparatus according to claim 1, further comprising:

a storing unit configured to store information indicating data to which the data processing apparatus operating in the second mode can respond without shifting to the first power mode, wherein in a case where the OID specified in the SNMP packet received by the receiving unit matches with the information stored in the storing unit, the determining unit determines not to delay the data processing apparatus to shift from the first power mode to the second power mode, and in a case where the OID specified in the SNMP packet received by the receiving unit does not match with the information stored in the storing unit, the determining unit determines to delay the data processing apparatus to shift from the first power mode to the second power mode.

4. A method for a data processing apparatus operating in at least a first power mode and a second power mode consuming less power than the first mode, the method comprising:

receiving a Simple Network Management Protocol (SNMP) packet transmitted from an external apparatus;

determining whether to delay the data processing apparatus to shift from the first power mode to the second power mode based on an object identifier (OID) specified in the SNMP packet;

delaying, in a case where the determining determines to delay the data processing apparatus to shift from the first power mode to the second power mode, the data processing apparatus to shift from the first power mode to the second power mode for a predetermined time, and in a case where the determining determines not to delay the data processing apparatus to shift from the first power mode to the second power mode, not delay the data processing apparatus to shift from the first power mode to the second power mode; and shifting from the first power mode to the second power mode when the predetermined time elapses.

5. The method according to claim 4, wherein in a case where the OID specified in the SNMP packet is a specific OID, the determining determines not to delay the data processing apparatus to shift from the first power mode to the second power mode, and in a case where the OID specified in the SNMP packet is not a specific OID, the determining determines to delay the data processing apparatus to shift from the first power mode to the second power mode.

6. The method according to claim 4, further comprising:

a storing unit configured to store information indicating data to which the data processing apparatus operating in the second mode can respond without shifting to the first power mode, wherein in a case where the OID specified in the SNMP packet received by the receiving unit matches with the information stored in the storing unit, the determining unit determines not to delay the data processing apparatus to shift from the first power mode to the second power mode, and in a case where the OID specified in the SNMP packet received by the receiving unit does not match with the information stored in the storing unit, the determining unit determines to delay the data processing apparatus to shift from the first power mode to the second power mode.

7. A computer readable storage medium storing a program of instructions for causing a computer to perform a method for a data processing apparatus operating in at least a first power mode and a second power mode consuming less power than the first mode, the method comprising:

receiving a Simple Network Management Protocol (SNMP) packet transmitted from an external apparatus;

determining whether to delay the data processing apparatus to shift from the first power mode to the second power mode based on an object identifier (OID) specified in the SNMP packet;

delaying, in a case where the determining determines to delay the data processing apparatus to shift from the first power mode to the second power mode, the data processing apparatus to shift from the first power mode to the second power mode for a predetermined time, and in a case where the determining determines not to delay the data processing apparatus to shift from the first power mode to the second power mode, not delay the data processing apparatus to shift from the first power mode to the second power mode; and shifting from the first power mode to the second power mode when the predetermined time elapses.

8. The computer readable storage medium according to claim 7, wherein in a case where the OID specified in the SNMP packet is a specific OID, the determining determines not to delay the data processing apparatus to shift from the first power mode to the second power mode, and in a case where the OID specified in the SNMP packet is not a specific OID, the determining determines to delay the data processing apparatus to shift from the first power mode to the second power mode.

9. The computer readable storage medium according to claim 7, further comprising:

a storing unit configured to store information indicating data to which the data processing apparatus operating in the second mode can respond without shifting to the first power mode, wherein in a case where the OID specified in the SNMP packet received by the receiving unit matches with the information stored in the storing unit, the determining unit determines not to delay the data processing apparatus to shift from the first power mode to the second power mode, and in a case where the OID specified in the SNMP packet received by the receiving unit does not match with the information stored in the storing unit, the determining unit determines to delay the data processing apparatus to shift from the first power mode to the second power mode.

* * * * *